(12) United States Patent
Choi et al.

(10) Patent No.: US 6,613,707 B2
(45) Date of Patent: Sep. 2, 2003

(54) DIELECTRIC CERAMIC COMPOSITIONS

(75) Inventors: Chang Hak Choi, Seoul (KR); Jun Hwan Jeong, Inchon (KR); Byung Kyu Kim, Seoul (KR); Min Han Kim, Seoul (KR); Sahn Nahm, Seoul (KR); Hwack Joo Lee, Daejeon (KR)

(73) Assignee: Amotech Co., Ltd., Kyungki-do (KR)

( * ) Notice: Subject to any disclaimer, the term of this patent is extended or adjusted under 35 U.S.C. 154(b) by 245 days.

(21) Appl. No.: 09/862,332

(22) Filed: May 23, 2001

(65) Prior Publication Data

US 2002/0119886 A1 Aug. 29, 2002

(30) Foreign Application Priority Data

Feb. 27, 2001 (KR) ........................................ 2001-10131

(51) Int. Cl.$^7$ ............................................. C04B 35/465
(52) U.S. Cl. ...................................................... 501/136
(58) Field of Search ........................................... 501/136

(56) References Cited

U.S. PATENT DOCUMENTS 5,314,651 A  *  5/1994  Kulwicki .................... 264/620
5,356,844 A     10/1994  Hirahara et al.
6,025,291 A      2/2000  Murakawa

* cited by examiner

*Primary Examiner*—David Brunsman

(57) ABSTRACT

The present invention discloses a dielectric ceramic composition having a formula represented by $(1-x)Nd(Ga_{1-y}Al_y)O_3 - xCaTiO_3$, wherein x refers a mole fraction of $CaTiO_3$ to the composition and satisfies an expression of $0.5 \leq x \leq 0.8$, and y refers a mole fraction of Al to Ga and satisfies an expression of $0 \leq y \leq 0.9$. The present dielectric substance has a high dielectric constant and a high Q value and a resonant frequency temperature coefficient of near 0. Also, it can be sintered at a low temperature and thus replace the conventional dielectric materials used as a filter for parts of mobile communication or satellite communication appliances.

2 Claims, 6 Drawing Sheets

DIELECTRIC CERAMIC COMPOSITIONS

BACKGROUND OF THE INVENTION

1. Field of the Invention

The invention relates to dielectric ceramic compositions, and more particularly high frequency dielectric ceramic compositions, which have a dielectric constant of at least 45, a Q value of at least 43,000, and a stable resonant frequency temperature coefficient, thereby being applicable to electrical parts for satellite or mobile communication appliances.

2. Description of the Related Art

In order to be used as parts for satellite or mobile communication appliances, a high frequency dielectric desirably has a high Q value, a stable resonant frequency temperature coefficient($\tau_f$), and a high dielectric constant ($\epsilon_r$). In general, high frequency dielectrics are divided into three classes: high dielectrics having a dielectric constant of at least 60, mid dielectrics having a dielectric constant between 40 and 60, and low dielectric loss materials having a dielectric constant of 30 or less.

The dielectrics having the high dielectric constant typically include $BaO-Re_2O_3-TiO_2$(Re=rare earth) type and $(Pb,Ca)ZrO_3$ type. The dielectrics having the low dielectric loss include, for example, $Ba(Zn_{1/3}Ta_{2/3})O_3$ and $Ba(Mg_{1/3}Ta_{2/3})O_3$.

A dielectric having the mid dielectric constant ($\epsilon_r \geq 45$) and a high Qxf (>43,000) has not been developed. Thus there is a demand for such dielectric substance.

Meanwhile, known existing dielectrics having a mid dielectric constant include $(Zr,Sn)TiO_4$, $(1-x)LaAlO_3-x(Ca$ (or $Sr) TiO_3$, $(1-x)La(Zn_{1/2}Ti_{1/2})O_3-xCa$ (or $Sr)TiO_3$, $(1-x)NdAlO_3-xCaTiO_3$, etc.

The $(Zr,Sn)TiO_4$ has a Qxf of 45,000, an $\epsilon_r$ of 38 and a temperature coefficient of near 0. This material has a high Q value, however, has a disadvantage in having a low dielectric constant.

The dielectrics having a compositional formula represented by $(1-x)LaAlO_3-x(Ca(or Sr)TiO_3$ show various dielectric properties depending on their composition ratios. In particular, it has been reported that a dielectric material having a composition of $0.35LaAlO_3-0.65 (Ca(or Sr)TiO_3S$ shows microwave dielectric properties with a Qxf of 47,000, $\epsilon_r$ of 38 and $\tau_f$ of 5 ppm/° C. (See U.S. Pat. No. 5,356,844). However, this ceramic material also has a low dielectric constant, although it has a relatively high Q value. Accordingly, there are problems to be applied in practical elements.

Similarly, the ceramics having a compositional formula represented by $(1-x)$ La $(Zn_{1/2}Ti_{1/2})O_3-xCa$ (or Sr) $TiO_3$ show various dielectric properties depending on their composition ratios. In particular, a dielectric composition of $0.5La(Zn_{1/2}Ti_{1/2})O_3-0.5Ca(or Sr)TiO_3$ shows good properties with a Qxf of 50,000, $\epsilon_r$ of 38 and $\tau_f$ of 5 ppm/° C. However, these ceramic compositions also have a low dielectric constant and thus cannot be readily used in manufacturing practical elements.

In 1994, dielectric compositions having a formula represented by $(1-x)NdAlO_3-xCaTiO_3$, which show good dielectric properties with a Qxf of 47,000, $\epsilon_r$ of 43 and $\tau_f$ of −1 ppm/° C. However, these dielectrics have a disadvantage in that it can be hardly sintered and thus has to be sintered at a temperature of 1450° C. or higher (See U.S. Pat. No. 6,025,291).

Therefore, there are demands for a dielectric having excellent sintering properties as well as a mid dielectric constant ($\epsilon_r$>45), a high Q value (Qxf of 43,000 or higher) and a good resonant frequency temperature coefficient.

SUMMARY OF THE INVENTION

Therefore, the present invention has been made in order to solve the above-described problems involved in the dielectric ceramic compositions of $(1-x)NdAlO_3-xCaTiO_3$. Now, we have completed the present invention after conducting repeated researches in order to lower the sintering temperature while maintaining at least dielectric properties of the dielectric composition of $(1-x)NdAlO_3-xCaTiO_3$.

An object of the present invention is to provide a new high frequency dielectric ceramic composition showing excellent sintering properties as well as good dielectric properties with a dielectric constant of 45 or more, a Q value of 45,000 or higher and a resonant frequency temperature coefficient of near 0.

In order to achieve the above object, the present invention provides dielectric ceramic compositions having a formula represented by $(1-x)Nd(Ga_{1-y}Al_y)O_3-xCaTiO_3$, wherein x refers a mole fraction of $CaTiO_3$ to the composition and satisfies an expression of $0.5 \leq x \leq 0.8$, and y refers a mole fraction of Al to Ga and satisfies an expression of $0 \leq y \leq 0.9$.

In accordance with the present invention, Ga is used as a main component since it has a Q value equal to Al but can lower the sintering temperature by about 100° C., thereby increasing a mass-productivity of a dielectric resonator. Also, by substituting Ga for a part of Al, it is possible to readily control the resonant frequency temperature coefficient, as there coexist three phases.

Meanwhile, the present invention sets limits to x, a mole fraction of $CaTiO_3$, as $0.5 \leq x \leq 0.8$. When x is less than 0.5, the dielectric constant is decreased excessively and the resonant frequency temperature coefficient becomes a too great negative (−) value. When x exceeds 0.8, the Q value is decreased excessively and the resonant frequency temperature coefficient becomes a too great positive (+) value. Therefore, it is not preferable for the composition to have x out of the above-described range.

Also, the present invention suitably sets limits y, a mole fraction of Al as $0 \leq y \leq 0.9$, preferably $0 \leq y \leq 0.5$. When y exceeds 0.9, the added amount of Al became larger and it is thus substantially difficult to expect a lowering of the sintering temperature.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE PREFERRED EMBODIMENTS

Now, a preferred embodiment according to the present invention will be described in detail.

The dielectric ceramic compositions according to the present invention are prepared using $Nd_2O_3$, $Ga_2O_3$, $Al_2O_3$, $CaCO_3$ and $TiO_2$ by means of a general solid phase method. Respective starting materials are weighed precisely in accordance with their mole fractions as above-described and wet-mixed together with zirconia balls in a nylon jar for 24 hours. The mixed and pulverized powder is dried and then calcined for 10 hours at 1200° C. The calcination product was secondly crushed and then dried. The obtained powder was formed into a disk shape and sintered for 6 hours at a temperature of 1350° C. to 1500° C.

Next, the sintered body was ground with abrasive paper and dried again. The resulted body was measured with respect to a Q value and a resonant frequency temperature coefficient in a metal cabinet. Also, it was measured for a dielectric constant using a parallel metal plate method. Herein, the resonant frequency temperature coefficient was measured at a temperature in a range of 25 to 85° C. and 5 GHz. The results are shown in FIGS. 1 to 6.

Figure 1:
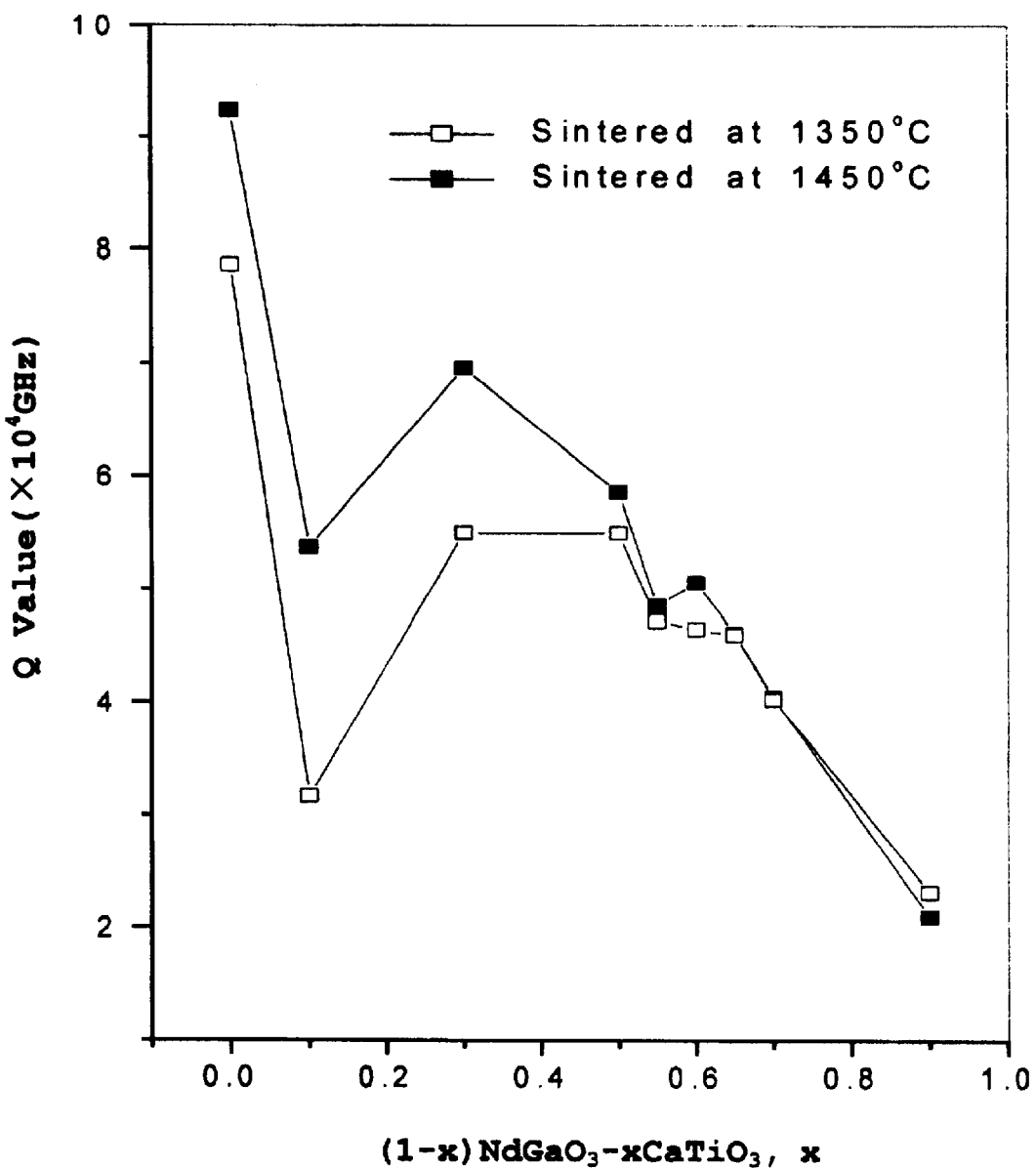
FIG. 1 is a graph showing the change of the Q value with respect to the content of $CaTiO_3$ in a dielectric composition having a formula represented by $(1-x)NdGaO_3-xCaTiO_3$ (y=0), which is sintered at a temperature of 1350° C. and 1450° C. for 6 hours according to the present invention.

FIG. 1 shows the change of the Q value with respect to the content of $CaTiO_3$ in a dielectric having a formula represented by $(1-x)NdGaO_3$-$xCaTiO_3$ (y=0), which is sintered at a temperature of 1350° C. and 1450° C. for 6 hours. As seen from FIG. 1, the Q value of $NdGaO_3$(when x=0) is about 90,000. Also, the Q value of the dielectric composition is decreased as the amount of $CaTiO_3$ in the composition increases. However, at the composition of $0.35NdGaO_3$-$0.65CaTiO_3$ the high Q value is as high as 46,000. In the case of the composition containing $NdGaO_3$ in a mole fraction of 0.5 or more, the Q values obtained when sintering at 1350° C. are less than those obtained when sintering at 1450° C. while in the case of the composition containing $NdGaO_3$ in a mole fraction of less than 0.5, the Q values obtained when sintering at 1350° C. are equal with those obtained when sintering at 1450° C.

According to results of SEM (Scanning Electron Microscope) analysis, the composition containing $NdGaO_3$ in a mole fraction of 0.5 or more, when sintered at 1350° C., has a microstructure with numerous pores and a low relative density and thereby a Q value lower than that obtained when sintering at 1450° C. However, as the amount of $CaTiO_3$ is increased, Ca—Ga liquid phase is formed, whereby the sintering of the composition is facilitated. As a result, a dense microstructure is constructed and the relative density is increased. Accordingly, when sintering at 1350° C., a Q value as high as when sintering at 1450° C. can be obtained.

Figure 2:
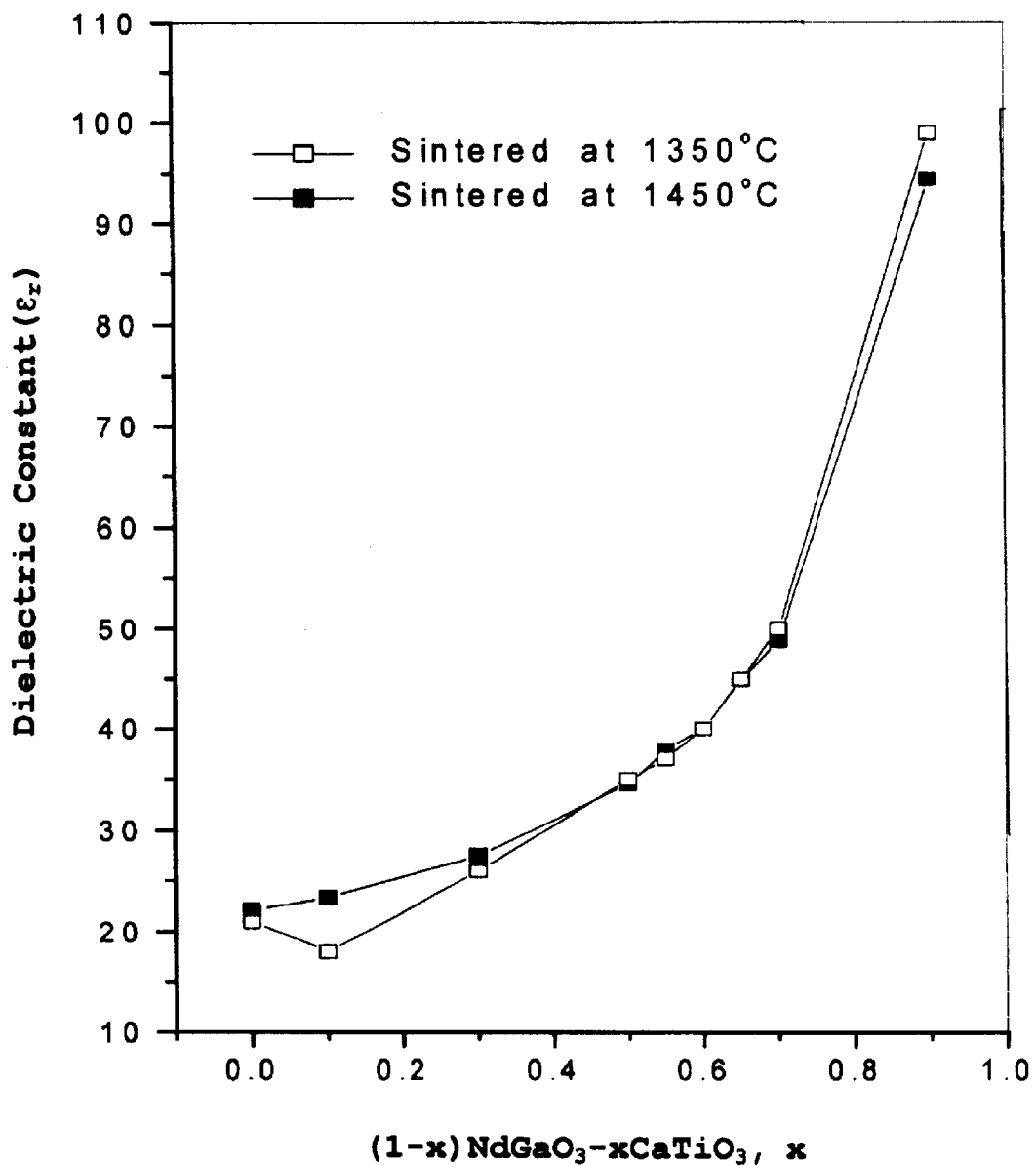
FIG. 2 is a graph showing the change of the dielectric constant with respect to the content of $CaTiO_3$ in a dielectric composition having a formula represented by $(1-x)NdGaO_3-xCaTiO_3$ (y=0), which is sintered at a temperature of 1350° C. and 1450° C. for 6 hours according to the present invention.

FIG. 2 shows the change of the dielectric constant with respect to the content of $CaTiO_3$ in a dielectric substance having a formula represented by $(1-x)NdGaO_3$-$xCaTiO_3$ (y=0), which is sintered at a temperature of 1350° C. and 1450° C. for 6 hours. It can be seen from FIG. 2 that the dielectric constant increases as the content of $CaTiO_3$ is increased. Also, it can be recognized that the dielectric containing $NdGaO_3$ in a mole fraction of 0.5 or more has a slightly high dielectric constant when sintered at 1450° C. However, in the case of the composition having $NdGaO_3$ in a mole fraction of less than 0.5, the sintering temperature does not affect the dielectric constant. Likewise to the Q value, this result can be explained by improvement in sintering, and thereby increase of density, and densification of microstructure. As shown in FIG. 2, all of two dielectric substances of $0.35NdGaO_3$-$0.65CaTiO_3$ (y=0), which are sintered at 1350° C. and 1450° C., respectively have a dielectric constant of 45.

Figure 3:
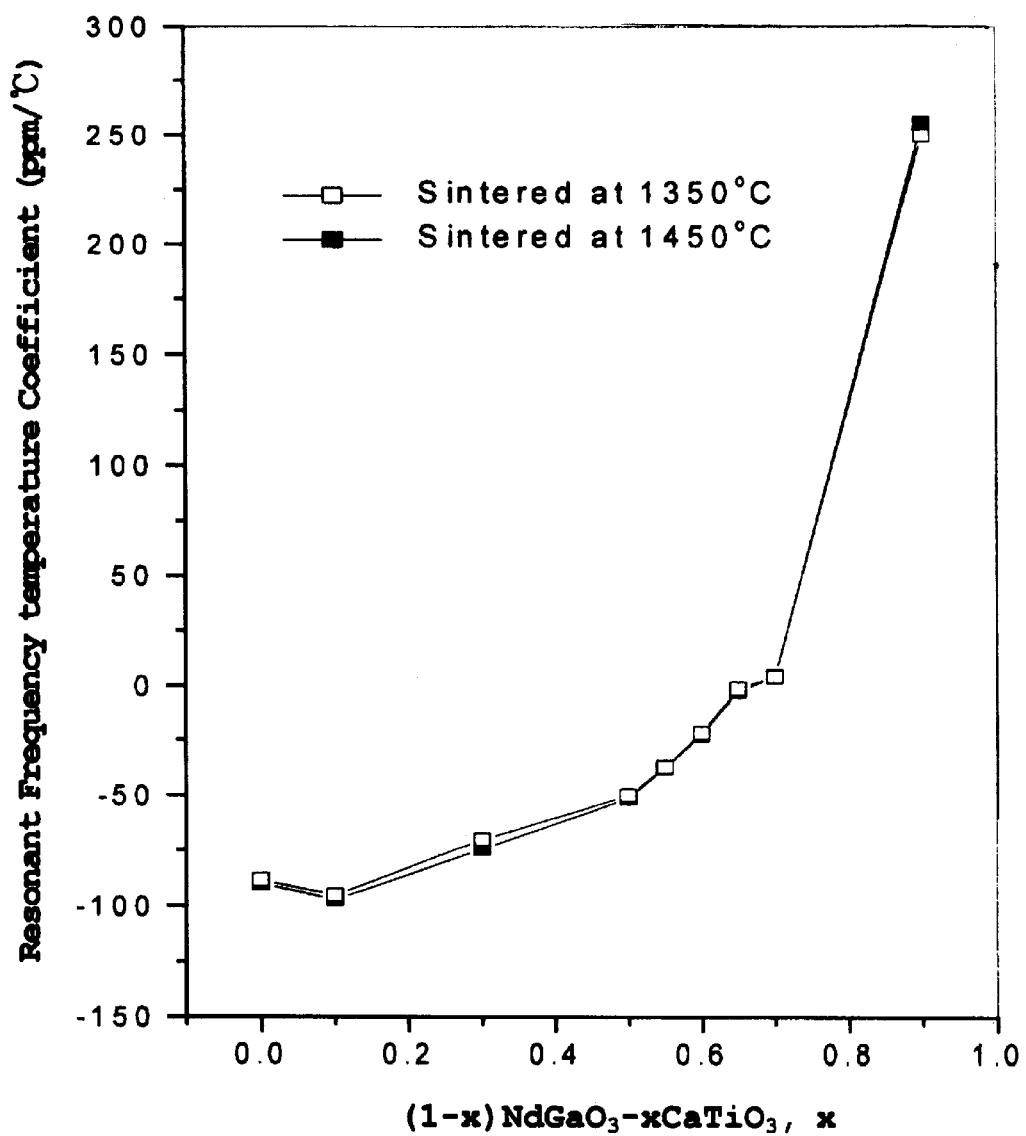
FIG. 3 is a graph showing the change of the resonant frequency temperature coefficient with respect to the content of $CaTiO_3$ in a dielectric composition having a formula represented by $(1-x)NdGaO_3-xCaTiO_3$ (y=0), which is sintered at a temperature of 1350° C. and 1450° C. for 6 hours according to the present invention.

FIG. 3 shows the change of the resonant frequency temperature coefficient with respect to the content of $CaTiO_3$ in a dielectric having a formula represented by $(1-x)NdGaO_3$-$xCaTiO_3$ (y=0), which is sintered at a temperature of 1350° C. and 1450° C. for 6 hours. The dielectric composition of $NdGaO_3$, i.e. when x=0, has a resonant frequency temperature coefficient of about −70, regardless of the sintering temperature. As the content of $CaTiO_3$ is increased, the resonant frequency temperature coefficient increases. Also, the dielectric composition of $0.35NdGaO_3$-$0.65CaTiO_3$ has a resonant frequency temperature coefficient of −2 ppm/° C.

As seen from the above results, by combining $NdGaO_3$ which has a high Q value but has a low dielectric constant and a negative resonant frequency temperature coefficient with $CaTiO_3$ which has a high dielectric constant and a positive resonant frequency temperature coefficient but has a low Q value, dielectric compositions with good properties can be obtained. In particular, a dielectric composition of $0.35NdGaO_3$-$0.65CaTiO_3$ shows good dielectric properties with a dielectric constant of 45, a Q value of 46,000 and a a resonant frequency temperature coefficient of −2 ppm/° C. even when sintered at 1350° C.

Figure 4:
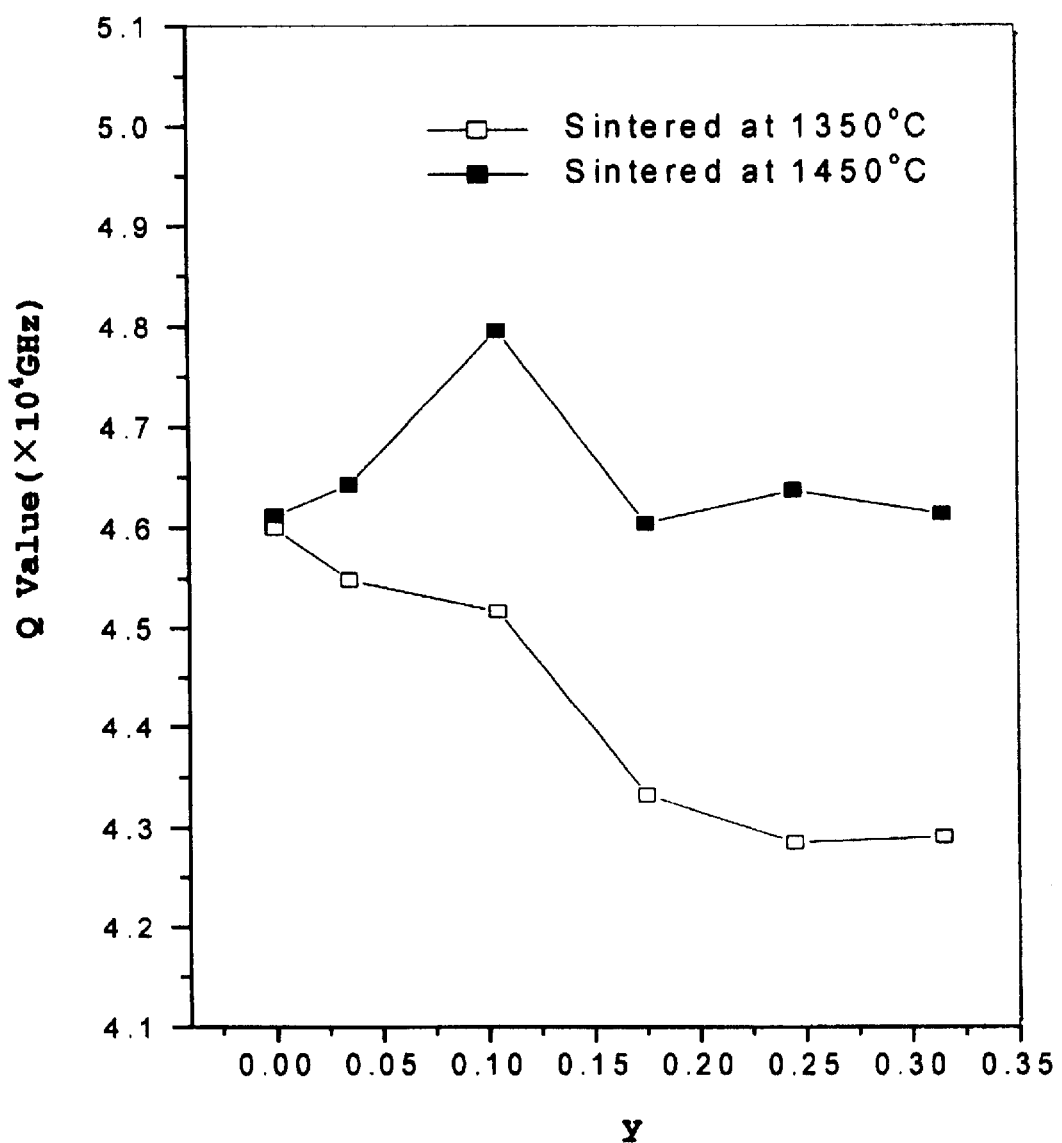
FIG. 4 is a graph showing the change of the Q value with respect to the content of Al in a dielectric composition having a formula represented by $0.35Nd(Ga_{1-y}Al_y)O_3$-$0.65CaTiO_3$ (x=0.65), which is sintered at a temperature of 1350° C. and 1450° C. for 6 hours according to the present invention.

FIG. 4 shows the change of the Q value with respect to the content of Al in the dielectric substance having a formula of $0.35Nd(Ga_{1-y}Al_y)O_3$-$0.65CaTiO_3$, which is sintered at a temperature of 1350° C. and 1450° C. for 6 hours. When sintered at 1450° C., addition of a small amount of Al may increase the Q value slightly. In particular, when y=0.1, the Q value is about 48,000. As y is increased over 0.1, the Q value decreases again. When sintered at 1350° C., the Q value decreases slightly as the Al content increases. However, as shown in FIG. 4, the magnitude of change of the Q value is not so big and the body sintered at 1350° C. has a good Q value.

Figure 5:
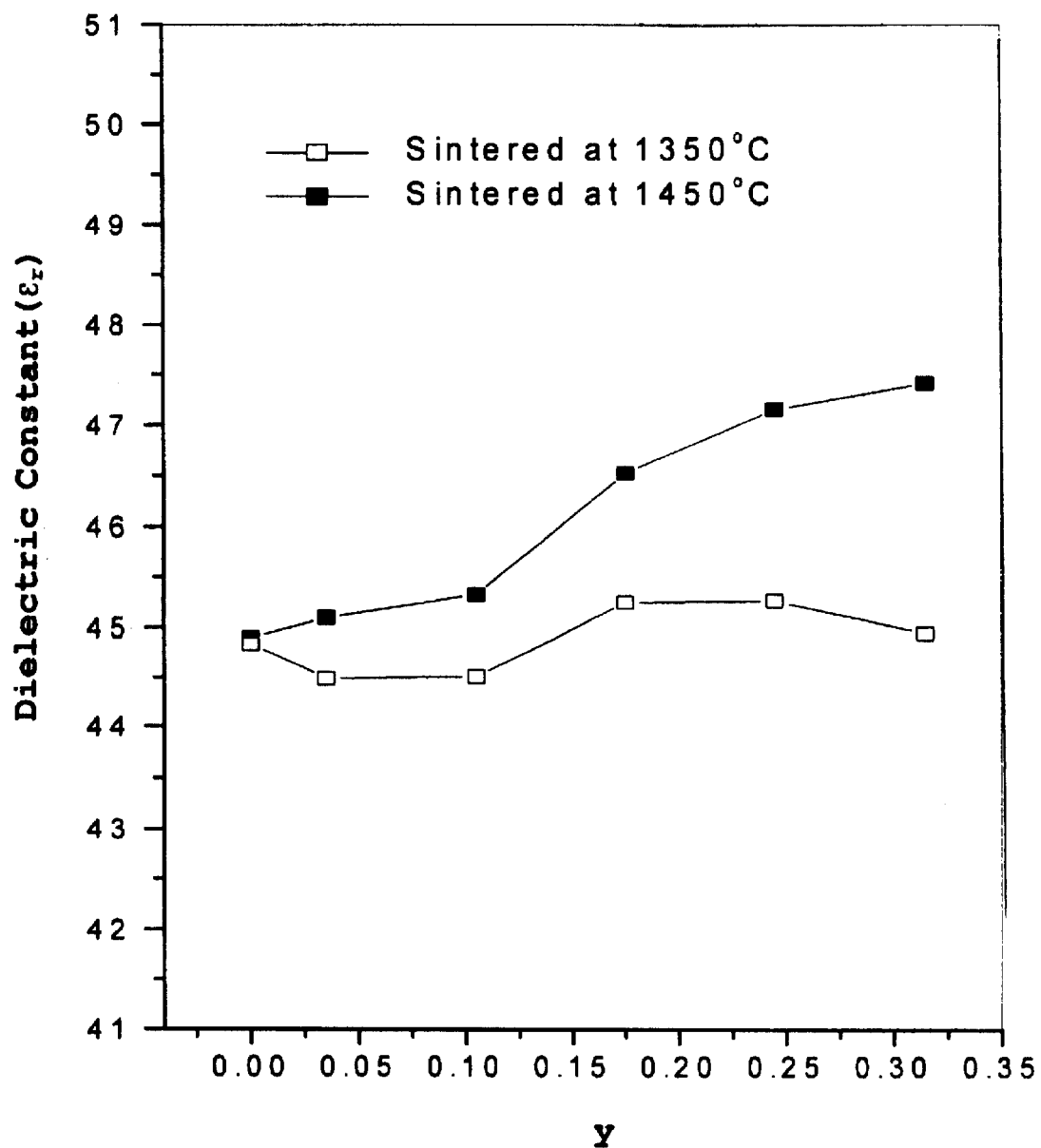
FIG. 5 is a graph showing the change of the dielectric constant with respect to the content of Al in a dielectric composition having a formula represented by $0.35Nd(Ga_{1-y}Al_y)O_3$-$0.65CaTiO_3$, which is sintered at a temperature of 1350° C. and 1450° C. for 6 hours according to the present invention.

FIG. 5 shows the change of the dielectric constant with respect to the content of Al in the dielectric having a formula represented by $0.35Nd(Ga_{1-y}Al_y)O_3$-$0.65CaTiO_3$, which is sintered at a temperature of 1350° C. and 1450° C. for 6 hours. The dielectric constant increases as the content of Al is increased. When sintered at 1450° C., the dielectric constant is 48 at y of 0.315 and about 45 at y of 0.035.

Figure 6:
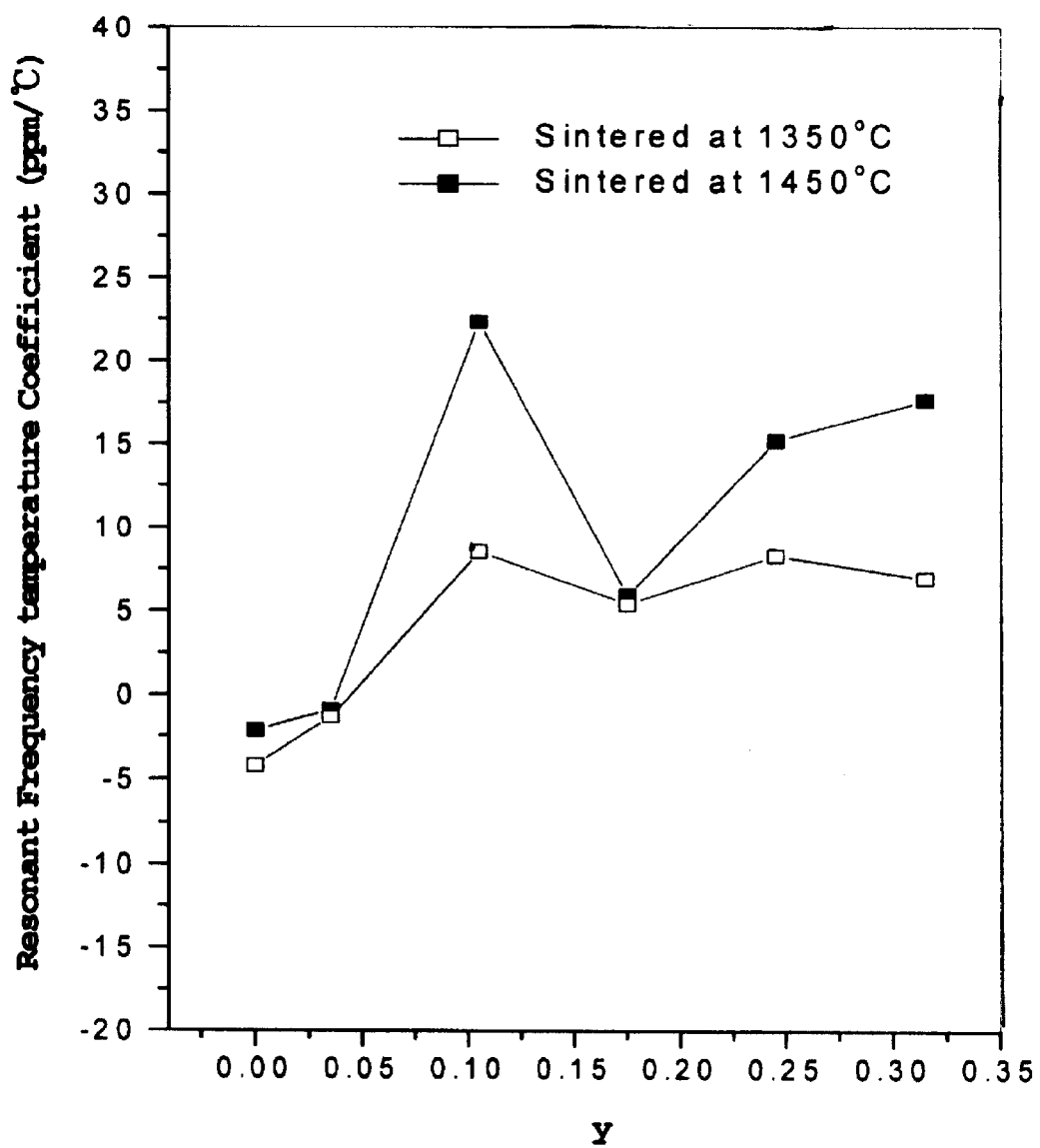
FIG. 6 is a graph showing the change of the resonant frequency temperature coefficient with respect to the content of Al in a dielectric composition having a formula represented by $0.35Nd(Ga_{1-y}Al_y)O_3$-$0.65CaTiO_3$, which is sintered at a temperature of 1350° C. and 1450° C. for 6 hours according to the present invention.

FIG. 6 shows the change of the resonant frequency temperature coefficient with respect to the content of Al in the dielectric having a formula represented by $0.35Nd(Ga_{1-y}Al_y)O_3$-$0.65CaTiO_3$, which is sintered at a temperature of 1350° C. and 1450° C. for 6 hours. The resonant frequency temperature coefficient does not vary considerably depending on the sintering temperature. It varies within the range of from −0.8 to 22 in accordance with the addition of Al. Therefore, it is possible to attain dielectric materials having various resonant frequency temperature coefficients according to the added amount of Al. In particular, a dielectric composition having a formula represented by $0.35Nd(Ga_{1-y}Al_y)O_3$-$0.65CaTiO_3$ wherein y=0.35, may be used in communication appliances as a mid dielectric material, which has a dielectric constant of 45 or more, a Q value of 46,000 or high and a resonant frequency temperature coefficient of −0.8 ppm/°C.

As described above, the dielectric ceramic composition having a formula represented by $(1-x)Nd(Ga_{1-y}Al_y)O_3$-$xCaTiO_3$, according to the present invention is capable of being sintered at a low temperature of 1350° C. and has good dielectric properties. In particular, according to the present invention, it is possible to provide a dielectric composition having a higher dielectric constant by 2 to 3 than that of the dielectric composition represented by a formula of $(1-x)NdGaO_3$-$xCaTiO_3$ in the prior art.

Thus, the dielectric ceramic compositions in accordance with the present invention have advantages in that it is possible to be sintered at a low temperature, thereby being readily prepared while maintaining at least the dielectric properties, as compared to the dielectric composition having a formula represented by $(1-x)NdGaO_3$-$xCaTiO_3$ in the prior art.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A dielectric ceramic composition represented by a formula $(1-x)Nd(Ga_{1-y}Al_y)O_3$-$xCaTiO_3$, wherein x refers a mole fraction of $CaTiO_3$ to the composition and satisfies an expression of $0.5 \leq x \leq 0.8$, and y refers a mole fraction of Al to Ga and satisfies an expression of $0 \leq y \leq 0.9$.

2. The dielectric ceramic composition according to claim 1, wherein y satisfies an expression of $0 \leq y \leq 0.5$.

* * * * *